United States Patent Office 3,257,278
Patented June 21, 1966

3,257,278
13β-ALKYL-Δ$^{4,9,11}$-GONATRIENE-3-ONES
Gerard Nomine, Noisy-le-Sec, Robert Bucourt, Clichy-sous-Bois, and Andre Pierdet, Noisy-le-Sec, France, assignors to Roussel-UCLAF, Paris, France, a corporation of France
No Drawing. Filed Sept. 3, 1965, Ser. No. 485,091
Claims priority, application France, July 5, 1963, 940,549; Oct. 4, 1963, 949,608, 949,609; May 15, 1964, 974,762; Aug. 14, 1964, 985,285; June 1, 1965, 19,090
21 Claims. (Cl. 167—74)

The present application is a continuation-in-part application of our copending, commonly assigned applications Serial No. 345,601, filed February 18, 1964, and Serial No. 397,627, filed September 18, 1964, both cases now abandoned.

The invention relates to novel 13β-alkyl-Δ$^{4,9,11}$-gonatrienes of the formula

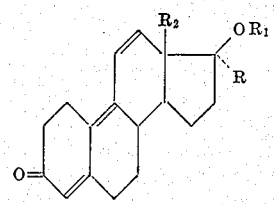

(I)

wherein R is an unsaturated aliphatic hydrocarbon having 2 to 7 carbon atoms which may be substituted with a halogen, $R_1$ is selected from the group consisting of hydrogen and an acyl radical of an organic carboxylic acid having 1 to 18 carbon atoms and $R_2$ is an alkyl of 1 to 4 carbon atoms. The invention also relates to a novel process for the preparation of the said compounds and novel intermediates thereof as well as to novel compositions having endocrinic properties.

It is an object of the invention to provide the novel 13β-alkyl-Δ$^{4,9,11}$-gonatrienes of Formula I.

It is another object of the invention to provide a novel process for the preparation of the 13β-alkyl-Δ$^{4,9,11}$-gonatrienes of Formula I.

It is a further object of the invention to provide novel intermediates for the preparation of 13β-alkyl-Δ$^{4,9,11}$-gonatrienes of Formula I.

It is an additional object of the invention to provide novel compositions having endocrinic properties.

These and other objects and advantages of the invention will become obvious from the following detailed description.

The novel 13β-alkyl-Δ$^{4,9,11}$-gonatrienes of the invention have the formula

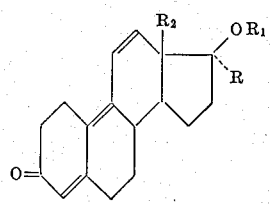

wherein R is an unsaturated aliphatic hydrocarbon having 2 to 7 carbon atoms which may be substituted with a halogen such as fluorine, chlorine, bromine and iodine, $R_1$ is selected from the group consisting of hydrogen and an acyl radical of an organic carboxylic acid having 1 to 18 carbon atoms and $R_2$ is an alkyl of 1 to 4 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethylpropionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenylacetic acid and phenylpropionic acid; aryl carboxylic acids such as benzoic acid and 2,4-dinitrobenzoic acid; phenoxy alkanoic acids such as phenoxyacetic acid, p-chlorophenoxy acetic acid, 2,4-dichlorophenoxy acetic acid, 4-tert.-butylphenoxy acetic acid, 3-phenoxy propionic acid and 4-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acids such as acetylacetic acid, propionylacetic acid and butyrylacetic acid; amino acids such as diethylaminoacetic acid and aspartic acid.

The novel process of the invention for the preparation of 13β-alkyl-Δ$^{4,9,11}$-gonatrienes of Formula I comprises reacting a 13β-alkyl-Δ$^{4,9,11}$-gonatriene-17β-ol-3-one with a compound selected from the group consisting of hydroxylamine and α-lower alkyl hydroxylamines and acid salts thereof to form the corresponding 3-oximido-13β-alkyl-Δ$^{4,9,11}$-gonatriene-17β-ol, oxidizing the latter to form the corresponding 3-oximido-13β-alkyl-Δ$^{4,9,11}$-gonatriene-17-one, reacting the latter with an organo metallic compound wherein the organo radical is R to form the corresponding 3 - oximido-13β-alkyl-17α-R-Δ$^{4,9,11}$-gonatriene-17β-ol and hydrolyzing the latter to form the corresponding 13β-alkyl-17α-R-Δ$^{4,9,11}$-gonatriene-17β-ol-3-one which may be esterified in the 17-position with an organic acid acylating agent such as the acid anhydride or acid chloride. The reaction scheme is illustrated in Table I.

TABLE I

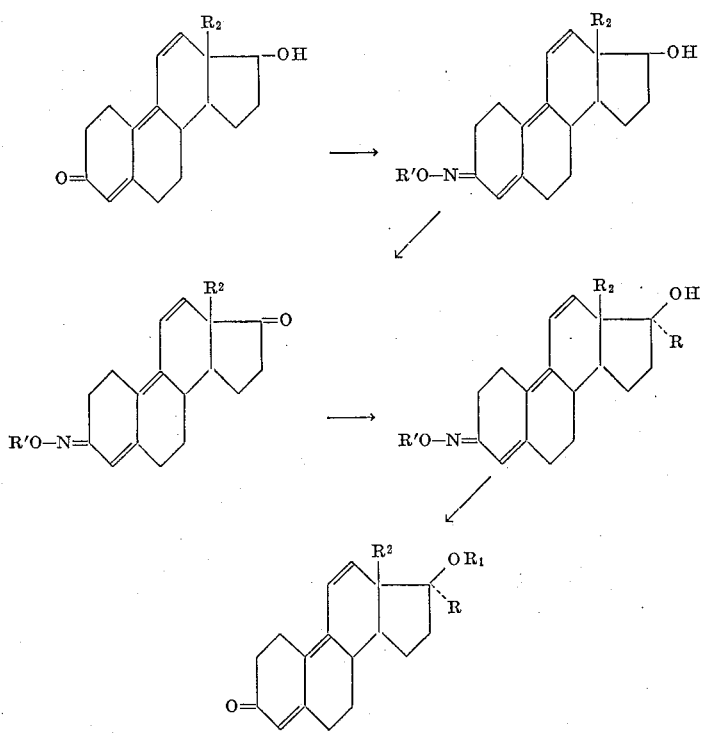

wherein R, $R_1$ and $R_2$ have the above definitions and R' is selected from the group consisting of hydrogen and lower alkyl.

Because of the reactivity of the double bonds in the 4-5, 9-10 and 11-12 positions, the 3-keto group cannot be blocked with the usual steroid blocking groups such as cyclic acetals, enol ethers or enamines. The formation of the 3-oximido group assures protection of the 3-keto group during the introduction of the substituents at the 17-position and easy conversion back to the 3-keto group when desired.

The oxidation of the 17β-hydroxy group is advantageously effected by double exchange of the functions with a ketone in the presence of an aluminum alcoholate, i.e., with cyclohexanone in the presence of aluminum isopropylate according to the Oppenauer process.

Examples of suitable organo metallic compounds for reaction with the 3-oximido-13β-alkyl-$\Delta^{4,9,11}$-gonatriene-17-one are alkenyl magnesium or zinc halides such as vinyl magnesium bromide, allyl magnesium bromide, etc., alkynyl magnesium halides such as ethynyl magnesium bromide, ethoxy ethynyl magnesium bromide, propynyl magnesium or zinc bromide, etc., and organo alkali metal such as chloroethynyl lithium, etc. In place of the organo magnesium bromides, the corresponding chlorides and iodides may be used.

A preferred mode of the process for the preparation of 13β-alkyl-$\Delta^{4,9,11}$-gonatriene-3-ones of Formula I comprises reacting a 13β-alkyl-$\Delta^{4,9,11}$-gonatriene-17β-ol-3-one with hydroxylamine hydrochloride in the presence of sodium acetate to form a 3-oximido-13β-alkyl-$\Delta^{4,9,11}$-gonatriene-17β-ol, oxidizing the latter by reaction with cyclohexanone in the presence of aluminum isopropylate to form a 3-oximido-13β-alkyl-$\Delta^{4,9,11}$-gonatriene-17-one, reacting the latter with an organo metallic compound to form the corresponding 3-oximido-13β-alkyl-17α-R-$\Delta^{4,9,11}$-gonatriene-17β-ol and hydrolyzing the latter in the presence of an acid such as pyruvic acid or nitrous acid to form the desired 13β-alkyl-17α-R-$\Delta^{4,9,11}$-gonatriene-17β-ol-3-one.

A variation of the process for the preparation of 13β-alkyl-17α-vinyl-$\Delta^{4,9,11}$-gonatriene-17β-ol-3-one comprises forming the 13β-alkyl-17α-ethynyl-$\Delta^{4,9,11}$-gonatriene-17β-ol-3-one and selectively hydrogenating the latter with a palladium catalyst in an organic solvent such as a mixture of tetrahydrofuran, dimethylformamide and pyridine.

The 13β-alkyl-$\Delta^{4,9,11}$-gonatriene-17β-ol-3-ones used as the starting material for the process of the invention may be prepared as described in our commonly assigned, copending application Serial No. 397,628, filed September 18, 1964, which comprises forming a 3-chloro-5-acetoxy-13β-alkyl-17β-acyloxy-4,5-seco - $\Delta^{2,5(10),9(11)}$ - gonatriene, brominating and dehydrobrominating the latter to form 3-chloro-13β-alkyl-17β-acyloxy - 4,5 - seco-$\Delta^{2,9,11}$-gonatriene-5-one, hydrolyzing the latter to form 13β-alkyl-17β-acyloxy-4,5-seco-$\Delta^{9,11}$-gonadiene-3,5-dione and cyclizing the latter to form the said starting material.

The 13β-alkyl-$\Delta^{4,9,11}$-gonatrienes of Formula I possess endocrinic properties. For example, 13β-methyl-17α-vinyl-$\Delta^{4,9,11}$-gonatriene-17β-ol-3-one possesses anabolic activity with little androgenc activity; 13β-methyl-17α-ethynyl-$\Delta^{4,9,11}$-gonatriene-17β-ol-3-one possesses an important hypocholesterolemic activity, inhibiting activity on hypophysis and progestomimetic actvity; 13β-ethyl-17α-ethynyl-$\Delta^{4,9,11}$-gonatriene-17β-ol-3-one possesses antiestrogenic, progestomimetic and antizygote activities; 13β-propyl-17α-ethynyl-$\Delta^{4,9,11}$-gonatriene-17β-ol-3-one possesses inhibiting activity on hypophysis (anti-FSH); 13β-methyl-17α-chloroethynyl-$\Delta^{4,9,11}$-gonatriene-17β-ol-3-one possesses progestomimetic and hypophysial inhibiting activities; 13β-methyl - 17α - 2' - propynyl-$\Delta^{4,9,11}$-gonatriene-17β-ol-3-one and 13β-methyl-17α-butadiynyl-$\Delta^{4,9,11}$-gonatriene-17β-ol-3-one possess antizygote activity; 13β-methyl-17α-allyl-$\Delta^{4,9,11}$-gonatriene - 17β - ol-3-one possesses progestomimetic, androgenic and anabolic activity and 13β-methyl-17α-1'-propynyl - $\Delta^{4,9,11}$ - gonatriene-17β-ol-3-one possesses progestomimetic activity.

The novel compositions of the invention having endocrinic properties are comprised of 13β-alkyl-Δ$^{4,9,11}$-gonatrienes of the formula

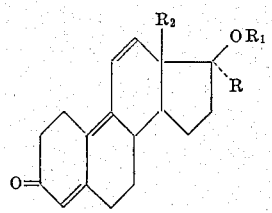

wherein R is an unsaturated aliphatic hydrocarbon having 2 to 7 carbon atoms and which may be substituted with a halogen, $R_1$ is selected from the group consisting of hydrogen and an acyl radical of an organic carboxylic acid having 1 to 18 carbon atoms and $R_2$ is an alkyl of 1 to 4 carbon atoms, and a major amount of a pharmaceutical carrier. The said compositions may be prepared in the form of injectable solutions or suspensions, prepared in ampules, in multiple-dose flacons, in the form of implants, of tablets, of coated tablets, of glossettes and of suppositories prepared in the usual manner. The usual useful dosage given to warm-blooded animals may vary between very large limits depending upon the illness to be treated.

Compositions containing 13β-alkyl-17α-vinyl-Δ$^{4,9,11}$-gonatriene-17β-ol-3-ones are useful for the treatment of disturbances of protidic anabolism, asthenia, thinness, osteoporosis, senescence, retardation of consolidation of fractures, metabolic disturbances due to prolonged corticotherapy and they may be administered orally, perlingually, transcutaneously or rectally. The useful dosology of said compounds is between 5 and 10 mg. per dose and 5 and 40 mg. per day in the adult depending upon the method of administration.

Compositions containing 13β-alkyl-17α-ethynyl-Δ$^{4,9,11}$-gonatriene-17β-ol-3-ones are useful for the treatment of hypercholesterolemia being both preventive or curative agent for arterial disturbances, cerebral, arteritis, aortitis, coronaritis, angina pectoris, atheromatosis and they may be administered orally, perlingually, transcutaneously or rectally. The useful dosology of the said compound is between 1 and 5 mg. per day in the adult depending upon the method of administration.

In the following examples there are described several preferred embodiments to illustrate the invention. However, it should be understood that the invention is not intended to be limited to the specific embodiments.

EXAMPLE I

STEP A.—PREPARATION OF 3-OXIMIDO-13β-METHYL-Δ$^{4,9,11}$-GONATRIENE-17β-OL 1.520 gm. of 13β-methyl-Δ$^{4,9,11}$-gonatriene-17β-ol-3-one obtained according to United States application Serial No. 397,628 were introduced into 38 cc. of ethanol. The reaction mixture was heated to reflux under agitation and under an atmosphere of nitrogen and a solution of 4.350 gm. of sodium acetate, 1.950 gm. of hydroxylamine hydrochloride and 19.5 cc. of distilled water was added thereto. The reflux was maintained under agitation and under nitrogen for a period of about 2 hours and then the reaction mixture was allowed to cool and was poured onto a mixture of water and ice. The precipitate formed was extracted with ethyl acetate and the combined extracts were washed with water several times and distilled under vacuum to dryness to obtain 1.693 gm. of raw 3-oximido-13β-methyl-Δ$^{4,9,11}$-gonatriene-17β-ol which was used as such for the following step of the synthesis. This product was a mixture of two isomeric forms of the oxime which will be called forms A and B.

This product is not described in the literature.

By operating in a similar manner but starting from 13β-propyl-Δ$^{4,9,11}$-gonatriene-17β-ol-3-one prepared as described in our copending United States application Serial No. 397,628, the reaction proceeds similarly to produce 3-oximido-13β-propyl-Δ$^{4,9,11}$-gonatriene-17β-ol.

STEP B.—PREPARATION OF 3-OXIMIDO-13β-METHYL-Δ$^{4,9,11}$-GONATRIENE-17-ONE 1.693 gm. of the product obtained in Step A were introduced into 270 cc. of toluene and 39 cc. of cyclohexanone and the reaction mixture was heated to reflux under agitation and under a nitrogen atmosphere. Then, a solution of 2 gm. of aluminum isopropylate in 140 cc. of toluene was slowly added while distilling therefrom an identical volume of the solvent. Then, the reaction mixture had added thereto in a single charge 8 cc. of cyclohexanone followed in about one hour by a solution of 1 gm. of aluminum isopropylate in 100 cc. of toluene while continuing the distillation to maintain constant the level of the solvent. The reaction mixture was cooled and the precipitate was vacuum filtered and triturated several times with hot methanol. The methanolic solution was subjected to entrainment with steam for a period of about 1½ hours. The steam distillate was cooled and extracted with ethyl acetate. The combined extracts were washed with water and distilled to dryness under vacuum to obtain 1.445 gm. (86% yield) of raw 3-oximido-13β-methyl-Δ$^{4,9,11}$-gonatriene-17-one which was used for the next step. It is not described in the literature.

The product represented a mixture of the isomeric forms A and B of the compound. To purify the mixture, it was dissolved in methylene chloride and subjected to chromatography through magnesium silicate and elution with methylene chloride containing 1% methanol to obtain 1.955 gm. (72% yield) of the pure mixture.

3-oximido-13β-propyl-Δ$^{4,9,11}$-gonatriene-17-one was prepared in a similar manner by treating 3-oximido-13β-propyl-Δ$^{4,9,11}$-gonatriene-17β-ol as above described.

EXAMPLE II

*Preparation of 13β-methyl-17α-1'-propynyl-Δ$^{4,9,11}$-gonatriene-17β-ol-3-one*

STEP A.—PREPARATION OF 3-OXIMIDO-13β-METHYL-17α-1'-PROPYNYL-Δ$^{4,9,11}$-GONATRIENE-17β-OL

A stream of gaseous propyne was passed through 500 cc. of tetrahydrofuran until an increase in weight of 25 gm. had been obtained. Under agitation, this solution was added to 100 cc. of a 3 N methyl magnesium bromide solution in ether cooled to 0° C. and the solution thus obtained was agitated for 2 hours. 60 cc. of the prepared propynyl magnesium bromide solution were added drop by drop with agitation to a solution of 2.5 gm. of 3-oximido-13β-methyl-Δ$^{4,9,11}$-gonatriene-17-one obtained according to Step B of Example I in 100 cc. of dry benzene. When the addition was completed, the solution was held at reflux for 3 hours under a nitrogen atmosphere and then cooled to room temperature. The cooled solution was hydrolyzed by careful addition of 25 cc. of an aqueous solution of 10% ammonium chloride and was extracted three times with 25 cc. of ether. The ether extracts were combined, washed with water, dried and evaporated to dryness under vacuum with ordinary pressure. The dry residue was taken up in 25 cc. of acetone and recrystallized by heating and cooling to obtain 2.2 gm. of 3-oximido-13β-methyl-17α-1'-propynyl-Δ$^{4,9,11}$-gonatriene-17β-ol. It was soluble in benzene and chloroform and slightly soluble in cold acetone. This compound is not described in the literature.

STEP B.—PREPARATION OF 13β-METHYL-17α-1'-PROPYNYL-Δ$^{4,9,11}$-GONATRIENE-17β-OL-3-ONE 2 gm. of 3-oximido-13β-methyl-17α-1'-propynyl-Δ$^{4,9,11}$-gonatriene-17β-ol were suspended in a mixture of 25 cc. of acetic acid and 25 cc. of water and then 2.5 cc. of pyruvic acid were added and the mixture was held at reflux for 2 hours under a nitrogen atmosphere. The mixture was cooled and poured into 100 cc. of a sodium bicarbonate-saturated solution. The suspension was extracted three times with 25 cc. of ether and the ether extracts were combined and washed with water until the wash water was neutral, dried and brought to dryness under vacuum to obtain 1.68 gm. of crude product which was purified by chromatography through magnesium silicate in a methylene chloride solution. The derivative was eluted with methylene chloride containing 1% of methanol to obtain 1.54 gm. of 13β-methyl-17α-1'-propynyl-Δ$^{4,9,11}$-gonatriene-17β-ol-3-one. For purposes of analysis, the product was recrystallized from isopropylic ether.

The product occurred in the form of a solid compound in fine needle crystals having a yellowish color, and it was insoluble in water and soluble in ether, acetone, benzene and chloroform.

U.V. spectra:
λ max. 320 mμ, ε=30,500
λ max. 344 mμ, ε=28,400

This compound is not described in the literature.

EXAMPLE III

*Preparation of 13β-methyl-17α-ethynyl-Δ$^{4,9,11}$-gonatriene-17β-ol-3-one*

STEP A.—PREPARATION OF 3-OXIMIDO-13β-METHYL-17α-ETHYNYL-Δ$^{4,9,11}$-GONATRIENE-17β-OL 6 gm. of magnesium turnings were placed in suspension under an atmosphere of nitrogen in 300 cc. of anhydrous tetrahydrofuran and methyl bromide was allowed to bubble therethrough until the magnesium disappeared. The solution of methyl magnesium bromide obtained was cooled to about 40° C. and a current of anhydrous acetylene was allowed to bubble therethrough for a period of 3 hours whereby a solution of ethynyl magnesium bromide was obtained. The said solution of ethynyl magnesium bromide was heated to reflux under an atmosphere of nitrogen and slowly 0.82 gm. of 3-oximido-13β-methyl-Δ$^{4,9,11}$-gonatriene-17-one, obtained according to Step B of Example I, in 10 cc. of tetrahydrofuran were added. The heating to reflux was continued for a period of 2 hours and then the reaction mixture was cooled and slowly 100 cc. of a solution saturated with ammonium chloride was added thereto. The solution was extracted with ether and the extract was washed with water until the wash water was neutral and distilled to dryness under vacuum. 0.993 gm. of a product was obtained which was subjected to chromatography through magnesium silicate with elution with methylene chloride containing 1% of methanol to obtain 0.784 gm. of a mixture of the two isomeric A and B forms of 3-oximido-13β-methyl-17α-ethynyl-Δ$^{4,9,11}$-gonatriene-17β-ol.

This product was isoluble in water and dilute aqueous acids and alkalis and soluble in alcohols, ether, acetone, benzene and chloroform.

This product is not described in the literature.

In a similar manner, 3-oximido-13β-propyl-Δ$^{4,9,11}$-gonatriene-17-one and 3-oximido-13β-ethyl-Δ$^{4,9,11}$-gonatriene-17-one were each reacted with ethynyl magnesium bromide to form 3-oximido-13β-propyl-17α-ethynyl-Δ$^{4,9,11}$-gonatriene-17-ol and 3-oximido-13β-ethyl-17α-ethynyl-Δ$^{4,9,11}$-gonatriene-17β-ol.

These products are not described in the literature.

STEP B.—PREPARATION OF 13β-METHYL-17α-ETHYNYL-Δ$^{4,9,11}$-GONATRIENE-17β-OL-3-ONE 0.77 gm. of 3-oximido-13β-methyl-17α-ethynyl-Δ$^{4,9,11}$-gonatriene-17β-ol (mixture of the two isomeric forms) obtained in Step A were introduced into a mixture of 25 cc. of acetic acid, 25 cc. of water and 2.5 cc. of pyruvic acid. The reaction mixture was heated to reflux under an atmosphere of nitrogen for a period of one hour, and then was cooled. The cooled mixture was poured into iced water and an excess of sodium bicarbonate was added. The aqueous solution was extracted with ether and the extract was washed with water until neutral and distilled to dryness under vacuum to obtain 0.656 gm. of product. The product obtained was dissolved in methylene chloride, subjected to chromatography through magnaesium silicate, with elution with methylene chloride to obtain 0.51 gm. of product which was recrystallized by heating in isopropyl ether, cooling and vacuum filtering to obtain 0.36 gm. of 13β-methyl-17α-ethynyl-Δ$^{4,9,11}$-gonatriene-17-β-ol-3-one. For purification, the product was recrystallized from isopropyl ether and distilled at ordinary pressure whereby the product obtained had a melting point of 169° C.

The product occurred in the form of pale yellow needles insoluble in water and dilute aqueous acids and alkalis and soluble in alcohols, ether, acetone, benzene and chloroform.

*Specific rotation.*—[α]$_D^{20}$=+63° (c.=0.5% in ethanol).

*U.V. spectra.*—λ max. at 342 mμ, ε=29,100. λ max. at 238 mμ, ε=5,920.

*Analysis.*—$C_{20}H_{22}O_2$; molecular weight=294.38. Calculated: C, 81.59%; H, 7.53%. Found: C, 81.6%; H, 7.6%.

This compound is not described in the literature.

In a similar manner, 13β-propyl-17α-ethynyl-Δ$^{4,9,11}$-gonatriene-17β-ol-3-one and 13β-ethyl-17α-ethynyl-Δ$^{4,9,11}$-gonatriene-17β-ol-3-one having a melting point of 154° C. were obtained by reacting 3-oximido-13β-propyl-17α-ethynyl-Δ$^{4,9,11}$-gonatriene-17β-ol and 3-oximido-13β-ethyl-17α-ethynyl-Δ$^{4,9,11}$-gonatriene-17β-ol, respectively, according to the above-described process.

EXAMPLE IV

*Preparation of 13β-methyl-17α-vinyl-Δ$^{4,9,11}$-gonatriene-17β-ol-3-one*

0.429 gm. of 13β-methyl-17α-ethynyl-Δ$^{4,9,11}$-gonatriene-17β-ol-3-one, obtained as in Example III, where introduced into a mixture of 16 cc. of tetrahydrofuran, 16 cc. of anhydrous dimethylformamide and 1.6 cc. of pyradine. 0.04 gm. of catalyst containing 5% of palladium deposited on calcium carbonate was added under agitation at a temperature of 20 to 25° C. and the solution was hydrogenated. In 16 minutes, absorption attained a stage corresponding to 32 cc. or 1 mole of hydrogen. The catalyst was removed by vacuum filtration and the filtrate was concentrated to a small volume and was poured into a mixture of water and ice. The mixture was extracted with methylene chloride and the extract was washed with water and distilled to dryness under vacuum to obtain 0.48 gm. of raw 13β-methyl-17α-vinyl-Δ$^{4,9,11}$-gonatriene-17β-ol-3-one.

The product was dissolved in methylene chloride, subjected to chromatography through magnesium silicate with elution with methylene chloride and the product obtained was crystallized from a mixture of ethyl ether and isopropyl ether (1:1) to obtain 0.285 gm. of 13β-methyl-17α-vinyl-Δ$^{4,9,11}$-gonatriene-17β-ol-3-one having a melting point of 143–144° C. and a specific rotation [α]$_D^{20}$=−27° (c.=0.5% in ethanol).

The product occurred in the form of pale yellow crystals, insoluble in water and soluble in chloroform.

*Analysis.*—$C_{20}H_{24}O_2$; molecular weight=296.39. Calculated: C, 81.04%; H, 8.16%. Found: C, 80.9%; H, 8.4%.

This compound is not described in the literature.

EXAMPLE V

*Preparation of 13β-methyl-17α-vinyl-Δ$^{4,9,11}$-gonatriene-17β-ol-3-one*

STEP A.—PREPARATION OF 3-OXIMIDO-13β-METHYL-17α-VINYL-Δ$^{4,9,11}$-GONTRIENE-17β-OL

Using the method of Example III, a solution of vinyl magnesium bromide in tetrahydrofuran was heated to reflux under an atmosphere of nitrogen and a solution of 3-oximido - 13β - methyl - Δ$^{4,9,11}$ - gonatriene-17-one in tetrahydrofuran prepared in Step B of Example I was added thereto. At the end of 2 hours, the reaction mixture was cooled and a saturated solution of ammonium chloride was added thereto. The solution was extracted with ether and the extract was washed with water until the wash waters were neutral and distilled to dryness under vacuum. The product obtained was subjected to chromatography through magnesium silicate with elution with methylene chloride containing 1% of methanol to obtain a mixture of the isomeric A and B forms of 3-oximido-13β-methyl-17α-vinyl-Δ$^{4,9,11}$-gonatriene-17β-ol.

The product is not described in the literature.

STEP B.—PREPARATION OF 13β-METHYL-17α-VINYL-Δ$^{4,9,11}$-GONATRIENE-17β-OL-3-ONE

The 3-oximido-13β-methyl-17α-vinyl-Δ$^{4,9,11}$-gonatriene-17β-ol (mixture of the two isomers) prepared in Step A was introduced into a mixture of (1:1:0.1) of acetic acid, water and pyruvic acid and the mixture was heated to reflux under an atmosphere of nitrogen for a period of one hour. Thereafter, the mixture was cooled and poured into iced water. An excess of sodium bicarbonate was added and the mixture was extracted with ether. The ether extract was washed with water until the wash waters were neutral, distilled to dryness under vacuum and a raw product was recovered which was dissolved in methylene chloride. The solution was subjected to chromatography through magnesium silicate with elution with methylene chloride and the product was crystallized from a mixture of ethyl ether and isopropyl ether (1:1) to obtain 13β-methyl-17α-vinyl-Δ$^{4,9,11}$-gonatriene-17β-ol-3-one which was identical to the product obtained in Example IV.

EXAMPLE VI

Preparation of 13β-methyl-17α-allyl-Δ$^{4,9,11}$-gonatriene-17β-ol-3-one

STEP A.—PREPARATION OF 3: OXIMIDO-13β-METHYL-17α-ALLYL-Δ$^{4,9,11}$-GONATRIENE-17β-OL 10 gm. of magnesium turnings were placed in suspension in 40 cc. of ethyl ether under an atmosphere of nitrogen and agitation. In the space of 2 hours while heating to slight reflux, 20 gm. of allyl bromide in 160 cc. of ethyl ether were added and the heating to reflux was continued for a period of 30 minutes after the end of the addition to obtain a 0.7 N solution of allyl magnesium bromide. 0.55 gm. of 3-oximido-13β-methyl-Δ$^{4,9,11}$-gonatriene-17-one, prepared according to Step B of Example I were dissolved in 70 cc. of benzene at a temperature of +3° C. with agitation. 150 cc. of 0.7 N solution of allyl magnesium bromide were added in the space of 8 minutes and the agitation was continued for a period of 50 minutes at the original temperature. Thereafter a solution of ammonium chloride was added to the reaction mixture. The organic phase was separated, washed with water until the wash waters were neutral, dried and distilled to dryness. The product recovered was subjected to chromatography through magnesium silicate with elution with methylene chloride containing 1% of methanol to obtain 0.497 gm. of a mixture of two isomeric A and B forms of 3-oximido-13β-methyl-17α-allyl-Δ$^{4,9,11}$-gonatriene-17β-ol.

U.V. spectra.—λ max. at 321 mμ, ε=35,300 (in ethanol). λ max. at 333 mμ, ε=31,730.

This product is not described in the literature.

STEP B.—PREPARATION OF 13β-METHYL-17α-ALLYL-Δ$^{4,9,11}$-GONATRIENE-17β-OL-3-ONE

The isomeric mixture of 3-oximido-13β-methyl-17α-allyl-Δ$^{4,9,11}$-gonatriene-17β-ol prepared as in Step A was subjected to pyruvic acid hydrolysis to obtain 13β-methyl-17α-allyl-Δ$^{4,9,11}$-gonatriene-17β-ol-3-one.

EXAMPLE VII

Preparation of 13β-methyl-17α-chloroethynyl-Δ$^{4,9,11}$-gonatriene-17β-ol-3-one STEP A.—PREPARATION OF 3-OXIMIDO-13β-METHYL-17α-CHLOROETHYNYL-Δ$^{4,9,11}$-GONATRIENE-17β-OL A mixture of 10.8 cc. of 2.6 N ether solution of methyl lithium and 84 cc. of ether was prepared on an ice bath. A solution of 5.4 cc. of cis-dichloroethylene in 36 cc. of ether was added slowly and agitated under an atmosphere of nitrogen at room temperature for a period of one hour and a half. Then, 330 mg. of 3-oximido-13β-methyl-Δ$^{4,9,11}$-gonatriene-17-one obtained according to Step B of Example I dissolved in 27 cc. of ether were introduced and the reaction mixture was allowed to stand at rest overnight at room temperature. Thereafter, the reaction mixture was poured into a mixture of water and ice and was extracted with ether. The combined extracts were washed with water, dried and evaporated to dryness to obtain 252 mg. of raw 3-oximido-13β-methyl-17α-chloroethynyl-Δ$^{4,9,11}$-gonatriene-17β - ol (mixture of isomeric forms A and B). The product could be used as such for the following step of the synthesis.

This compound is not described in the literature.

STEP B.—PREPARATION OF 13β-METHYL-17α-CHLOROETHYNYL-Δ$^{4,9,11}$-GONATRIENE-17β-OL-3-ONE

A mixture of 252 mg. of an isomeric mixture of 3-oximido-13β-methyl - 17α - chloroethynyl - Δ$^{4,9,11}$ - gonatriene-17β-ol, 9.2 cc. of acetic acid, 0.92 cc. of pyruic acid and 9.2 cc. of water was heated to reflux for an hour under a nitrogen atmosphere with agitation. The reaction mixture was cooled and poured onto a mixture of water and ice. The cooled mixture was extracted with methylene chloride and the combined extracts were washed successively with sodium bicarbonate solution and with water, dried and evaporated to dryness under vacuum to obtain 139 mg. of 13β-methyl-17α-chloroethynyl-Δ$^{4,9,11}$-gonatriene-17β-ol-3-one. Melting point: 192–193° C.

This product is not described in the literature.

EXAMPLE VIII

Preparation of 13β-methyl-17α-butadiynyl-Δ$^{4,9,11}$-gonatriene-17β-ol-3-one

STEP A.—PREPARATION OF 3-ETHYLENEDIOXY-13β-METHYL-17α-BUTADIYNYL-Δ$^{4,9,11}$-GONATRIENE-17β-OL 1 cc. of freshly prepared butadiyne under an atmosphere of nitrogen was dissolved in 10 cc. of tetrahydrofuran while maintaining the mixture in the neighborhood of 0° C. Then 5 cc. of a normal solution of butyl lithium in petroleum ether were added under agitation and strong exterior cooling was maintained. The homogenous solution was strongly brown colored and this solution contained 0.005 mole of butadiynyl lithium.

To the tetrahydrofuran solution of the reactant prepared above, a solution of 0.490 gm. of 3-ethylenedioxy-13β-methyl-Δ$^{4,9,11}$-gonatriene-17-one in 5 cc. of tetrahydrofuran was added and the reaction mixture was maintained under agitation for 2½ hours in a bath of iced water. Then the reaction mixture was poured into 200 cc. of water and the precipitate was extracted with methylene chloride in four extractions. The methylene chloride extracts were combined, dried over sodium sulfate, filtered and evaporated to dryness to obtain 3-ethylenedioxy-13β-methyl-17α-butadiynyl - Δ$^{4,9,11}$ - gonatriene-17β-ol which was utilized as such for the continuation of the synthesis.

STEP B.—PREPARATION OF 13β-METHYL-17α-BUTADIYNYL-Δ$^{4,9,11}$-GONATRIENE-17β-OL-3-ONE

All of the product obtained in the preceding step was dissolved in 50 cc. of methanol. 5 cc. of acetic acid and 2.5 cc. of water were added to this solution. After an hour at room temperature, the reaction mixture was neutralized with a saturated solution of sodium bicarbonate and the aqueous phase was extracted with methylene chloride. The organic phase was dried and evaporated to dryness to obtain 0.591 gm. of 13β-methyl-17α-butadiynyl-$\Delta^{4,9,11}$-gonatriene-17β-ol-3-one in the form of a yellow amorphous compound. By chromatography in a thin bed, the presence of the said product was determined.

The raw product was purified by chromatography through silica gel. After fixation, the column was eluted with methylene chloride containing increasing amounts of acetone. The methylene fractions containing 2% of acetone allowed the isolation of 0.383 gm. of pure product which was homogenous in chromatography in a thin bed. The product remained amorphous.

Infrared spectra showed:
  Presence of hydroxyl group
  Presence of —C≡CH
  Presence of a trienic structure
  Absence of carbonyl in 17-position
  The spectra is different from that of the 17-ethynylated compound.

U.V. spectra (ethanol).—λ max. at 238 mμ, λ max. at 341 mμ.

The product occurred in the form of a yellow amorphous powder, soluble in alcohol, ether, acetone, benzene and chloroform.

This compound is not described in the literature.

EXAMPLE IX

*Preparation of 13β-methyl-17α-2'-propynyl-$\Delta^{4,9,11}$-gonatriene-17β-ol-3-one*

STEP A.—PREPARATION OF 3-OXIMIDO-13β-METHYL-17α-2'-PROPYNYL-$\Delta^{4,9,11}$-GONATRIENE-17β-OL 1.150 gm. of zinc previously washed with 2 N hydrochloric acid and with water, 30 cc. of tetrahydrofuran, and 500 mg. of 3-oximido-13β-methyl-$\Delta^{4,9,11}$-gonatriene-17-one were mixed while agitating and were heated to reflux; then 1.40 cc. of propargyl bromide were added slowly to the refluxing mixture, and agitation and reflux were continued for a period of 75 minutes. The mixture was then cooled to between +5° and +10° C., and 40 cc. of an aqueous saturated ammonium hydrochloride solution were added to it. The organic phase was decanted off, whereafter the aqueous phase was extracted with methylene chloride. The combined chloromethylenic phases were washed with water until neutral, and the wash waters were extracted with methylene chloride; the combined organic phases were dried over sodium sulfate and distilled to dryness under vacuum. 968 mg. of a raw product were obtained which were purified by subjecting them to chromatography through magnesium silicate and to a sequence of elutions, with methylene chloride then with methylene chloride containing 0.5% of methanol then with methylene chloride containing 1% of methanol; the 3-oximido-13β-methyl-17α-2'-propynyl-$\Delta^{4,9,11}$-gonatriene-17β-ol was obtained in the form of an amorphous product, which was soluble in alcohols, ether, acetone, benzene and chloroform, and insoluble in water and in aqueous dilute acids and alkalis. It was a mixture of the syn and the anti-oxime.

This product was utilized as such for the continuation of the synthesis.

STEP B.—PREPARATION OF 13β-METHYL-17α-2'-PROPYNYL-$\Delta^{4,9,11}$-GONATRIENE-17β-OL-3-ONE 500 mg. of the 3-oximido-13β-methyl-17α-2'-propynyl-$\Delta^{4,9,11}$-gonatriene-17β-ol obtained from Step A were mixed with 31 cc. of a solution made of 20 cc. of acetic acid, 20 cc. of water and 2 cc. of pyruvic acid. The mixture thus obtained was heated at a temperature of 110° C. under agitation and under a nitrogen atmosphere for a period of sixty minutes, then it was cooled to 0° C., and poured into 150 cc. of a mixture of water and ice. Sodium bicarbonate was added to the cooled solution until a pH of 8 to 8.5 was obtained. The solution was then extracted with methylene chloride. The organic phase was washed with water until neutral, dried over sodium sulfate, and evaporated to dryness under vacuum; 519 mg. of a raw product were obtained, which were purified by subjecting them to chromatography through magnesium silicate. By a sequence of elutions made first with pure methylene chloride, then with methylene chloride containing increasing amounts of acetone, 268 mg. of a pure product were obtained which were recrystallized from isopropyl ether. The recrystallization allowed the isolation of 190 mg. of 13β-methyl-17α-2'-propynyl-$\Delta^{4,9,11}$-gonatriene-17β-ol-3-one, which occurred in the form of yellow prisms soluble in alcohols, acetone, benzene and chloroform, slightly soluble in ether, insoluble in water and in aqueous acids and alkalis. Melting point: 158° C., specific rotation: $[\alpha]_D^{20} = -96°$ (c.=0.5% methanol).

This compound is not described in the literature.

Analysis.—$C_{21}H_{24}O_2 = 308.40$.  Calculated: C, 81.78%; H, 7.84%. Found: 81.5%; H, 7.9%.

Infrared spectra showed:
  Presence of a conjugated ketone at 1,655 cm.$^{-1}$ and 1,580 cm.$^{-1}$
  Presence of hydroxyl group at 3,580 cm.$^{-1}$
  Presence of a —C≡CH group at 3,310 cm.$^{-1}$ Ultraviolet spectra (ethanol):
λ max. at 238 mμ

$$E_{1\,cm.}^{1\%} = 192$$

Infl. at about 271 mμ.

$$E_{1\,cm.}^{1\%} = 116$$

λ max. at 341 mμ

$$E_{1\,cm.}^{1\%} = 985 \;(\epsilon = 30{,}400)$$

PHARMACOLOGICAL DATA

A. *Pharmacological study of 13β-methyl-17α-vinyl-$\Delta^{4,9,11}$-gonatriene-17β-ol-3-one*

The tests were effected according to the technique of Hershberger (Proc. Soc. Exp. Biol. Med., 1953, Vol. 83, p. 175), slightly modified. Some male rats castrated at the age of 25 days received the test compound by daily administration for a period of 10 days except the 6th day. The animals were treated starting from the day after castration and were sacrificed the 11th day 22 to 26 hours after the last administration. They were autopsied after the sacrifice and the organs of interest were separated and weighed. In particular, the lifter muscle of the anus (levator ani) was studied for the anabolic activity and the ventral prostate and the seminal vesicles were studied for androgenic activity.

13β-methyl-17α-vinyl-$\Delta^{4,9,11}$-gonatriene-17β-ol-3-one in aqueous suspension with carboxymethyl cellulose was administered orally at daily doses of 500γ×10/9 per rat. One lot of control animals received the dispersive alone. The results obtained are given in Table II in comparison with those obtained with 17α-vinyl-19-nor-testosterone administered at the same dose per rat and per day.

A second test practiced exactly under the same conditions at a daily dose of 2 mg.×10/9 per rat gave the results shown in Table III in comparison with 17α-ethyl-19-nor-testosterone administered at the same dose.

TABLE II

| Treatment | Daily dose | Duration of treatment (days) | Body weight in gym. Initial | Body weight in gym. Final | Seminal vesicules, mg. | Ventral prostate, mg. | Fresh levator ani, mg. | Lf [1] | Dried levator ani, mg. | Ls [2] |
|---|---|---|---|---|---|---|---|---|---|---|
| Controls | 0 | 10 | 47 | 85 | 4.3 | 3.6 | 12.4 | 0.142 | 3.3 | 0.038 |
| 17α-vinyl-19-nor-testosterone | 500×10/9 | 10 | 47 | 79 | 7.6 | 8.7 | 18.9 | 0.239 | 4.8 | 0.060 |
| 13β-methyl-17α-vinyl-$\Delta^{4,9,11}$-gonatriene-17β-ol-3-one | 500×10/9 | 10 | 47 | 71 | 16.0 | 27.1 | 23.6 | 0.336 | 5.8 | 0.081 |

[1] Lf = ratio of weight of fresh levator ani×10³ to body weight.
[2] Ls = ratio of weight of dried levator ani×10³ to body weight.

TABLE III

| Treatment | Daily dose | Seminal vesicules, mg. | Ventral prostate, mg. | Lf [1] | Ls [2] |
|---|---|---|---|---|---|
| 17α-ethyl-19-nor-testosterone | 2 mg.×10/9 | 7.7 | 21.9 | 0.515 | 0.100 |
| 13β-methyl-17α-vinyl-$\Delta^{4,9,11}$-gonatriene-17β-ol-3-one | 2 mg.×10/9 | 33.7 | 11.8 | 0.526 | 0.107 |

[1] Lf = ratio of weight of fresh levator ani×10³ to body weight.
[2] Ls = ratio of weight of dried levator ani×10³ to body weight.

Table II shows that at a daily dose of 500γ×10/9 per rat, 13β - methyl - 17α - vinyl - $\Delta^{4,9,11}$-gonatriene - 17β-ol-3-one has an analobic action clearly greater than that of 17α-vinyl-19-nor-testosterone and has only a weak androgenic activity more noticeable on the prostate than on the seminal vesicules. Table III shows that at a daily dose of 2 mg.×10/9 per rat, 13β-methyl-17α-vinyl-$\Delta^{4,9,11}$-gonatriene-17β-ol-3-one possesses an anabolic activity comparable to that of 17α-ethyl-19-nor-testosterone but the androgenic activity is very weak.

B. *Pharmacological study of 13β - methyl - 17α - ethynyl-$\Delta^{4,9,11}$-gonatriene-17β-ol-3-one*

The test was made on groups of female rats having an average weight of 200 gm., to which the product being studied was administered orally in aqueous suspension, at doses of 250 and 500 γ/kg. for a period of 10 days. One group of rats of the same age and weight served as a control group. Samples of blood were taken over an anticoagulant the first and the eleventh day in order to determine the amount of seric cholesterol. The animals were sacrificed the eleventh day and the liver, suprarenals and kidneys were separated and weighed. The results obtained of the tests are summarized in Tables IV and V.

TABLE IV

| Lots | Doses, γ/kg. | Seric cholesterol in gm./1,000 |
|---|---|---|
| Controls | 0 | 0.68 |
| 13β-methyl-17α-ethynyl-$\Delta^{4,9,11}$-gonatriene-17β-ol-3-one | 250 | 0.57 (−16%) |
|  | 500 | 0.34 (−50%) |

TABLE V

| Lots | Doses, γ/kg. | Liver, gm. per cent gm. | Suprarenals, mg. | Kidneys, mg. per cent mg. |
|---|---|---|---|---|
| Controls | 0 | 4.92 | 55.4 | 768 |
| 13β-methyl-17α-ethynyl-$\Delta^{4,9,11}$-gonatriene-17β-ol-3-one | 250 | 4.69 | 58.4 | 757 |
|  | 500 | 4.44 | 67.9 | 789 |

The data of Tables IV and V show that the hypocholesterolemic effect is very clear and the effect on the weight of the separated organs is negligible.

C. *Pharmacological study of 13β - methyl - 17α - allyl-$\Delta^{4,9,11}$-gonatriene-17β-ol-3-one*

The progestomimetic activity of 13β-methyl-17α-allyl-$\Delta^{4,9,11}$-gonatriene-17β-ol-3-one was determined by the Clauberg test using varying daily dosages of the compound in suspension in an aqueous dispersive liquid administered orally for five days. The results expressed in MacPhail units in Table VI clearly show the progestomimetic activity of the compound.

TABLE VI

| Daily dosage, mg. | MacPhail units |
|---|---|
| 0.004 | 0.3 |
| 0.02 | 1.6 |
| 0.1 | 2.8 |
| 0.5 | 2.7 |
| 2.5 | 3.0 |

D. *Pharmacological study of 13β - ethyl - 17α - ethynyl-$\Delta^{4,9,11}$-gonatriene-17β-ol-3-one*

The estrogenic activity determined by the Allen-Doisy test showed that the rat unit determined by subcutaneous injection was greater than 10 mg. and by oral administration was greater than 5 mg. In the test of the weight of the uterus in mice, determined by Velardo's method, the uterotrophic activity of the compound was negligible even at the considerable subcutaneous dose of 8 mg.

The anti-nidation activity of the said compound was determined by the minimum dose necessary to inhibit the implantation of post-coitum ovum after administration of the compound for 3 days. This dose was 200γ by subcutaneous administration and 200γ by oral administration. Therefore, 13β - ethyl - 17α - ethynyl - $\Delta^{4,9,11}$-gonatriene-17β-ol-3-one has an anti-nidation activity without any estrogenic side effects.

E. *Pharmacological study of 13β - methyl - 17α - chloroethynyl-$\Delta^{4,9,11}$-gonatriene-17β-ol-3-one*

The progestomimetic activity of 13β-methyl-17α-chloroethynyl-$\Delta^{4,9,11}$-gonatriene-17β-ol-3-one was determined by the Clauberg test practiced on immature rabbits previously sensitized by subcutaneous administration of the benzoate of estradiol for a period of 5 days at a daily dose of 10 μg. The compound was utilized in solution in olive oil containing 5% of benzyl alcohol and was administered orally for a period of 5 days at a dose of 200 μg. per day. The animals were sacrificed on the sixth day and the lacy proliferation of the endometrium characteristic of progestomimetic action was noted on the slices of the uterus.

At a dose of 200 μg. administered orally, the said 17α-chloroethynyl compound exercised the same progestomimetic action as progesterone administered subcutaneously at the same dose. Under the same experimental conditions, 17α-ethynyl-19-nor-testosterone produced the same effect at a daily dose of 1,000 μg. administered orally. Therefore, the said compound is five times more active than the 17α-ethynyl-19-nor-testosterone orally and it is orally as active as progesterone administered subcutaneously.

The estrogenic activity of 13β-methyl-17α-chloroethynyl-$\Delta^{4,9,11}$-gonatriene-17β-ol-3-one was studied both on the Allen-Doisy test as modified by Feyel-Cabanes (C.R. Soc. Biol. 1956, 150, 1881) and on the test of the weight of the uterus.

The Allen-Doisy test used castrated rats weighing 140±20 gm. who received a single administration of the said product. Vaginal smears were effected each day and the smears formed solely of keratinized cells were counted as positive. 13β-methyl-17α-chloroethynyl-$\Delta^{4,9,11}$-gonatriene-17β-ol-3-one utilized in aqueous suspension was administered orally at doses of 2 and 5 mg. per rat. No estrus was observed at a dose of 2 mg. but at 5 mg. five animals out of six presented an estrus for a period of a day and a half.

For the test of the weight of the uterus, the compound in solution in olive oil containing 5% of benzyl alcohol was administered orally to a lot of immature rats of 22 to 23 days at total doses of 0.05, 0.15 and 0.45 mg./rat, divided into six administrations, two each day for a period of 3 days. The animals were sacrificed and autopsied the fourth day, 72 to 75 hours after the first administration. The uterus was separated and weighed and the results obtained are shown in Table VII. In this table are also the results of a test practiced under the same experimental conditions with 17α-ethynyl-19-nor-testosterone administered orally at doses of 0.0166 mg., 0.05 mg. and 0.15 mg. as a comparison.

TABLE VII

| 13β-methyl-17α-chloro ethynyl-$\Delta^{4,9,11}$-gonatriene-17β-ol-3-one | | 17α-ethynyl-19-nor testosterone | |
|---|---|---|---|
| Doses administered (total doses), mg. | Weight of the uterus, mg. | Doses administered (total doses), mg. | Weight of the uterus, mg. |
| 0.05 | 38.78 | 0.0166 | 28.74 |
| 0.15 | 47.60 | 0.05 | 57.92 |
| 0.45 | 73.8 | 0.15 | 69.86 |

In this test, the product of the invention showed about three times less activity than 17α-ethynyl-19-nor-testosterone.

The hypophysial inhibitory activity of 13β-methyl-17α-chloroethynyl-$\Delta^{4,9,11}$-gonatriene-17β-ol-3-one was determined in rats by a test of parabiosis by administering orally the compound in solution in olive oil containing 5% of benzyl alcohol at daily doses of 75 and 150γ. The results are shown in Table VIII.

TABLE VIII

| Compound | Daily doses, γ | Castrated rat donor | Entire rat receiver | |
|---|---|---|---|---|
| | | Uterus, mg. | Ovaries, mg. | Uterus, mg. |
| 13β-methyl-17α-chloroethynyl-$\Delta^{4,9,11}$-gonatriene-17β-ol-3-one. | 75 | 59.5 | 19.7–28.6 | 57.7–55.0 |
| | 150 | 104.7 | 19.4 | 123.7 |
| Controls | 0 | 40.2 | 154.8 | 160.6 |

F. *Pharmacological study of 13β-methyl-17α-ethynyl-$\Delta^{4,9,11}$-gonatriene-17β-ol-3-one*

The progestomimetic activity of 13β-methyl-17α-ethynyl-$\Delta^{4,9,11}$-gonatriene-17β-ol-3-one was determined by the Clauberg test using immature rabbits previously folliculinized and was compared with 17α-ethynyl-19-nor-testosterone and Norethynodrel. The said products were administered orally for 5 days and the animals were killed on the sixth day. The uterus was studied and the endometral lace was noted on a scale from 0 to 4 according to MacPhail's method. The results are summarized in Table IX.

TABLE IX

| Daily dose in mg. | 13β-methyl-17α-ethynyl-$\Delta^{4,9,11}$-gonatriene-17β ol-3-one | | 17α-ethynyl-19-nor-testosterone | | Norethynodrel | |
|---|---|---|---|---|---|---|
| | No. of rabbits | MacPhail units | No. of rabbits | MacPhail units | No. of rabbits | MacPhail units |
| 0.2 | 6 | 1.9 | 4 | 1.5 | | |
| 0.4 | 2 | 2.3 | 4 | 1.7 | | |
| 0.5 | | | | | 11 | 1.4 |
| 1.0 | | | | | 5 | 1.4 |
| 2.0 | 5 | 2.6 | 9 | 1.5 | | |
| 4.0 | 2 | 2.6 | 8 | 1.2 | 4 | 0 |

The results of Table IX clearly show that 13β-methyl-17α-ethynyl-$\Delta^{4,9,11}$-gonatriene-17β-ol-3-one has a greater progestomimetic activity than 17α-ethynyl-19-nor-testosterone while Norethynodrel has only a slight progestomimetic activity.

The hypophysial inhibiting activity was determined by the method of Bunster et al. (Anatom. Rec. 1933, Vol. 57, p. 339) by parabiosis in rats. The castrated rats are united in parabiosis with non-castrated females of the same age (30 days). The castration is effected on the same day as the union and the castrated animals (donors) were treated for the next 10 days. The animals were killed on the eleventh day and the ponderal development of the genital organs of the receiver was studied to determine the desired activity. The compounds were administered orally in solution in olive oil containing 5% benzyl alcohol. The results are summarized in Table X.

TABLE X

| Treatment | No. of parabiants | Mortality | Dose in mg. per parabiants | Castrated female donor uterus in mg. | Complete female receiver ||| Uterus, mg. |
| --- | --- | --- | --- | --- | --- | --- | --- | --- |
| | | | | | Ovaries || | |
| | | | | | Individual weight, mg. | Average weight, mg. | | |
| Controls | 15 | 0 | 0 | 35.0<br>40.2<br>43.3 | ------<br>------<br>------ | 208.2<br>154.8<br>187.1 | | 235.1<br>160.6<br>207.6 |
| 13β-methyl-17α-ethynyl-Δ⁴,⁹,¹¹-gonatriene-17β-ol-3-one. | 5 | 1 | 25 | 115.7 | 12.5  40.9<br>63.3  76.4 | 48.3 | | 140.6 |
| | 5 | 0 | 75 | 64.2 | 27.0  44.3<br>50.3  54.1<br>83.1 | 51.8 | | 215.3 |
| | 5 | 2 | 150 | 141.6 | 14.6  16.5<br>53.9 | 28.3 | | 118.0 |
| 17α-ethnyl-19-nor-testosterone | 5 | 0 | 75 | 81.36 | 21.4  15.1<br>30.4  14.1<br>14.1 | 19.02 | | 49.34 |
| | 5 | 1 | 150 | 66.65 | 14.7  31.7<br>24.4 | 22.56 | | 99.67 |
| Norethynodrel | 5 | 1 | 25 | 92.0 | 16.2  25.5<br>15.6  39.8 | 23.5 | | 100.0 |
| | 5 | 3 | 75 | 106.7 | 18.4  29.9<br>31.4  17.0 | 24.1 | | 134.5 |
| | 5 | 0 | 150 | 136.0 | 11.8  14.3<br>22.5 | 19.0 | | 131.0 |

In all the dosages used for each product, the hypophysial inhibitor was definite was a higher activity seen for 13β - methyl-17α-ethynyl-Δ⁴,⁹,¹¹-gonatriene-17β-ol-3-one. The mortalities had no precise significance.

The acute toxicity was determined by oral administration of the compound to a group of 10 mice in a suspension in carboxymethyl cellulose at 0.25% in a volume of 10 cc. per kg. at a dosage of 100 mg./kg. No symptomatology or mortality was seen after a week of observation.

Various modifications of the process and compositions of the invention may be made without departing from the spirit or scope thereof and it is to be understood that the invention is to be limited only as defined in the appended claims.

We claim:

1. A 13β-alkyl-Δ$^{4,9,11}$-gonatriene of the formula

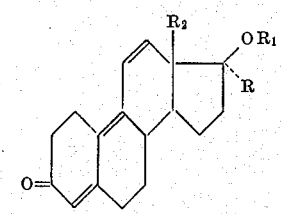

wherein R is an unsaturated aliphatic hydrocarbon having 2 to 7 carbon atoms and which may be substituted with a halogen, $R_1$ is selected from the group consisting of hydrogen and an acyl radical of an organic carboxylic acid having 1 to 18 carbon atoms and $R_2$ is an alkyl of 1 to 4 carbon atoms.

2. 13β - methyl-17α-ethynyl-Δ$^{4,9,11}$-gonatriene-17β-ol-3-one.

3. 13β-methyl-17α-vinyl-Δ$^{4,9,11}$-gonatriene-17β-ol-3-one.

4. 13β-methyl - 17α - allyl-Δ$^{4,9,11}$-gonatriene-17β-ol-3-one.

5. 13β-methyl - 17α - chloroethynyl-Δ$^{4,9,11}$-gonatriene-17β-ol-3-one.

6. 13β - methyl-17α-1'-propynyl-Δ$^{4,9,11}$-gonatriene-17β-ol-3-one.

7. 13β - propyl-17α-ethynyl-Δ$^{4,9,11}$-gonatriene-17β-ol-3-one.

8. 13β - ethyl-17α-ethynyl-Δ$^{4,9,11}$-gonatriene-17β-ol-3-one.

9. 13β - methyl-17α-2'-propynyl-Δ$^{4,9,11}$-gonatriene-17β-ol-3-one.

10. 13β - methyl-17α-butadiynyl-Δ$^{4,9,11}$-gonatriene-17β-ol-3-one.

11. A 3-oximido-Δ$^{4,9,11}$-gonatriene-17β-ol of the formula

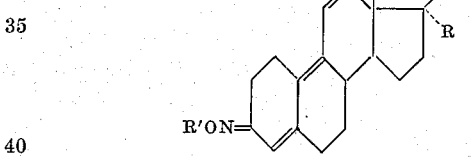

wherein R' is selected from the group consisting of hydrogen and lower alkyl, $R_2$ is an alkyl of 1 to 4 carbon atoms and R is an unsaturated aliphatic hydrocarbon having 2 to 7 carbon atoms and which may be substituted with a halogen.

12. 3-oximido - 13β - methyl-17α-ethynyl-Δ$^{4,9,11}$-gonatriene-17β-ol.

13. 3 - oximido - 13β - methyl-17α-vinyl-Δ$^{4,9,11}$-gonatriene-17β-ol.

14. 3 - oximido - 13β - methyl-17α-allyl-Δ$^{4,9,11}$-gonatriene-17β-ol.

15. 3 - oximido-13β-methyl-17α-chloroethynyl-Δ$^{4,9,11}$-gonatriene-17β-ol.

16. 3-oximido - 13β - methyl-17α-1'-propynyl-Δ$^{4,9,11}$-gonatriene-17β-ol.

17. 3-oximido - 13β - propyl-17α-ethynyl-Δ$^{4,9,11}$-gonatriene-17β-ol.

18. 3-oximido-13β-ethyl-17α-ethynyl-Δ$^{4,9,11}$-gonatriene-17β-ol.

19. 3 - oximido - 13β - methyl-17α-butadiynyl-Δ$^{4,9,11}$-gonatriene-17β-ol.

20. 3-oximido - 13β - methyl-17α-2'-propynyl-Δ$^{4,9,11}$-gonatriene-17β-ol.

21. A composition having endocrinic properties comprising a 13β-alkyl-Δ$^{4,9,11}$-gonatriene-3-one of the formula

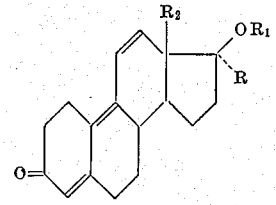

wherein R is an unsaturated aliphatic hydrocarbon having 2 to 7 carbon atoms and which may be substituted with a halogen, $R_1$ is selected from the group consisting of hydrogen and an acyl radical of an organic carboxylic acid having 1 to 18 carbon atoms and $R_2$ is an alkyl of 1 to 4 carbon atoms and a major amount of a pharmaceutical carrier.

No references cited.

LEWIS GOTTS, *Primary Examiner.*

H. FRENCH, *Assistant Examiner.*